M. VIERENGEL.
VEHICLE TIRE.
APPLICATION FILED APR. 14, 1916.

1,216,893.

Patented Feb. 20, 1917.

WITNESSES
Frederick Diehl.

INVENTOR
Matthew Vierengel
BY
ATTORNEYS

UNITED STATES PATENT OFFICE.

MATTHEW VIERENGEL, OF BROOKLYN, NEW YORK.

VEHICLE-TIRE.

1,216,893. Specification of Letters Patent. Patented Feb. 20, 1917.

Application filed April 14, 1916. Serial No. 91,042.

*To all whom it may concern:*

Be it known that I, MATTHEW VIERENGEL, a citizen of the United States, and a resident of the city of New York, borough of Brooklyn, in the county of Kings and State of New York, have invented a new and Improved Vehicle-Tire, of which the following is a full, clear, and exact description.

Among the principal objects which the present invention has in view are: to prevent total deflation of a pneumatic tire when punctured; to avoid the inconvenience incident to the puncturing or leaking of pneumatic tires; to prevent the disastrous loss of air incident to the puncture of the wearing shoe of a tire; and to provide means for obtaining a maximum pressure of air in the tire.

Drawings.

Figure 1:
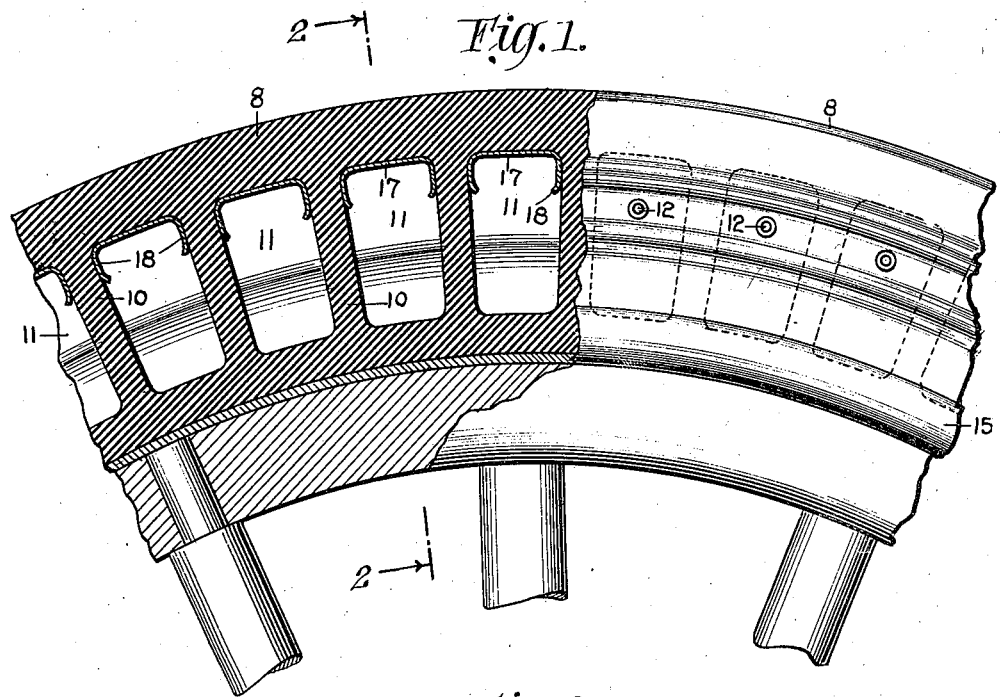
Figure 1 is a sectional elevation showing the side of a fragment of wheel and tire mounted thereon, the tire being constructed and arranged in accordance with the present invention.

Description.

As seen in the drawings, the tire is a unit structure in the sense that it dispenses with an inner tube. It depends, as do other pneumatic tires, for its resiliency on air which is trapped or held under pressure within the tire.

In the present construction, a tire is formed having a base flange 7, tread 8, connecting sides 9, and transverse partitions 10, arranged to form a series of chambers 11. The side walls 9 and partitions 10 are generally constructed with a large proportion of rubber, thereby accommodating the compression and expansion incident to the service to which the tire is subject.

Figure 2:
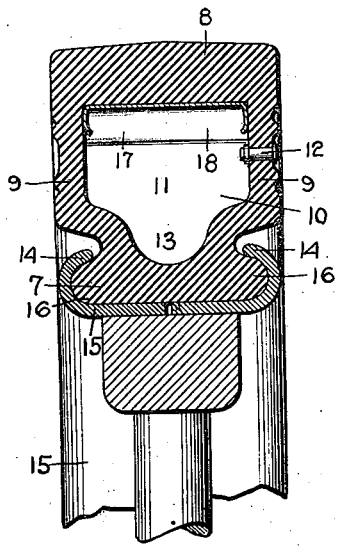
Fig. 2 is a cross section taken as on the line 2—2 in Fig. 1.

To enable the tire to support in traffic the load imposed thereon, air under pressure is introduced into the chambers 11, and into each of said chambers separately. To this end, each chamber has in one of the side walls 9 thereof, a valve 12, inwardly opening and adapted to prevent the leakage of air therefrom. The chambers 11 are shaped to provide in each a recess 13 extending to near the inner surface of the flange 7, so as to extend between the inturned edges 14 of the wheel rim 15. Provision is thus made for exerting transverse or lateral pressure on lips 16 of the tire, which operates to hold them under the inturned edges 14, as shown best in Fig. 2 of the drawings.

To prevent injurious puncture of the tread 8, each of the chambers 11 is provided with an armor plate 17. The armor plates 17 extend transversely across the tire to the full width of the chambers. Each plate 17 has inturned edges or sides 18, which serve to reinforce the partition 10 adjacent the tread 8 of the tire. The said plates are held in their position pressed outwardly against the tread portion of the tire, by means of air pressure introduced into the chambers 11.

When provided with a tire of the character disclosed, the operation of inflating the same consists in introducing air under pressure in relatively small quantities through each of the valves 12, to each of the chambers 11. It is obvious that while the structure necessitates that this operation be performed a number of times, the duration of the application is relatively slight. Therefore, the period of time required for the total inflation of the tire to the desired pressure, is about the same as now consumed in inflating tires of conventional make.

Claims.

1. The combination of a tire comprising integrally formed tread, base flange, side walls, and transverse partitions, said partitions being spaced at intervals for forming air-holding chambers; means for independently inflating each of said chambers; and means for preventing leakage from said chambers, said means comprising a non-puncturable device disposed in said chambers adjacent the outer walls thereof.

2. The combination of a tire comprising integrally formed tread, base flange, side walls, and transverse partitions, said partitions being spaced at intervals for forming air-holding chambers; means for independently inflating each of said chambers; and means for preventing leakage from said chambers, said means embodying a plurality of non-puncturable plates, one of said plates being inserted in each of said chambers adjacent said tread, said plates being directly acted upon by the air in said chambers.

3. The combination of a tire comprising integrally formed tread, base flange, side walls, and transverse partitions, said partitions being spaced at intervals for forming air-holding chambers; means for independently inflating each of said chambers; and means for preventing leakage from said chambers, said means embodying a plurality of non-puncturable plates, one of said plates being inserted in each of said chambers adjacent said tread, said plates being directly acted upon by the air in said chambers and being each provided with inturned sides, said sides being disposed in parallel relation to and in contact with said partitions, and at opposite sides thereof for reinforcing the same.

MATTHEW VIERENGEL.

Witnesses:
HARRY WILLIAM VIERENGEL,
HENRY VIERENGEL.